May 21, 1968 W. D. WALTHER ET AL 3,384,203
DISK BRAKES
Filed Jan. 13, 1966 2 Sheets-Sheet 2
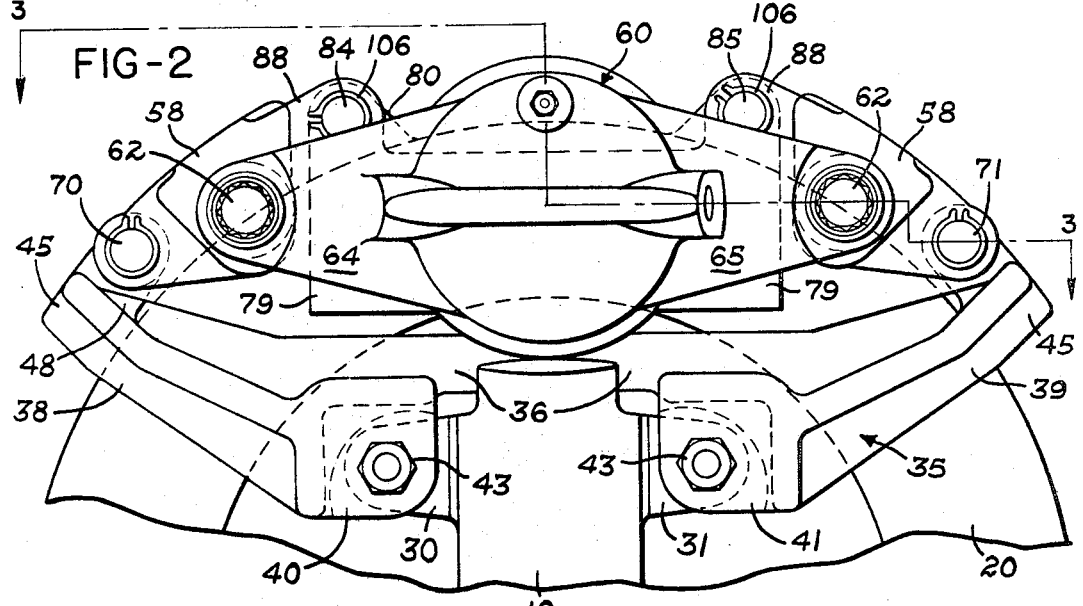
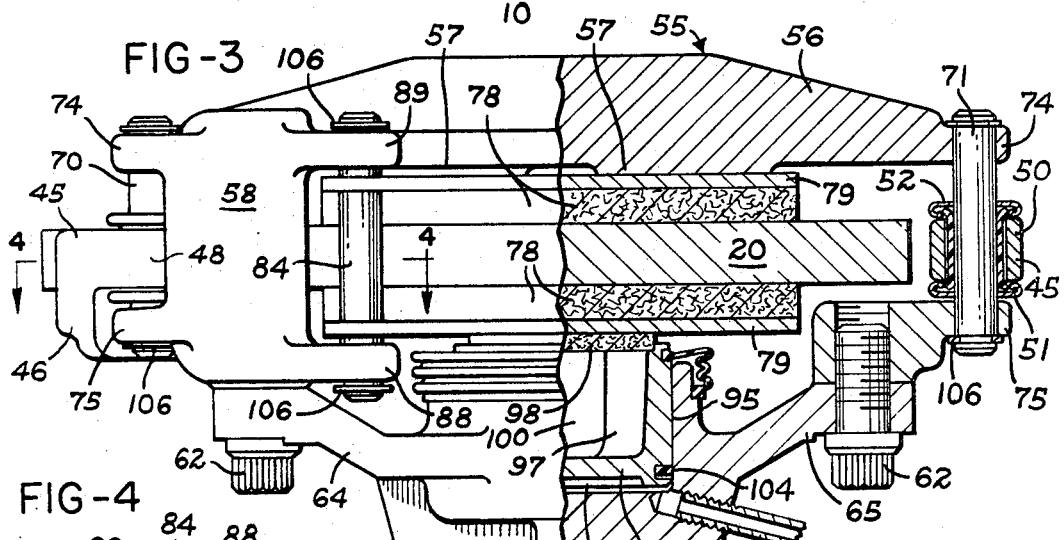
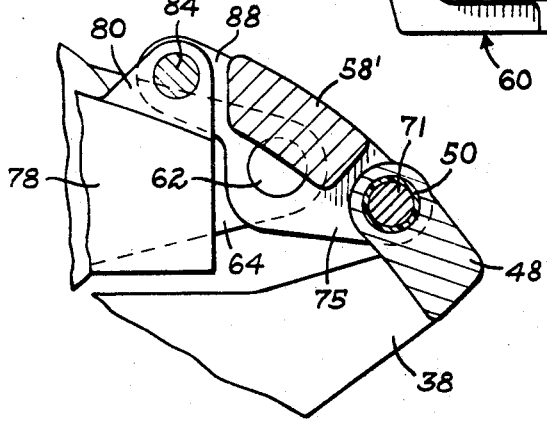

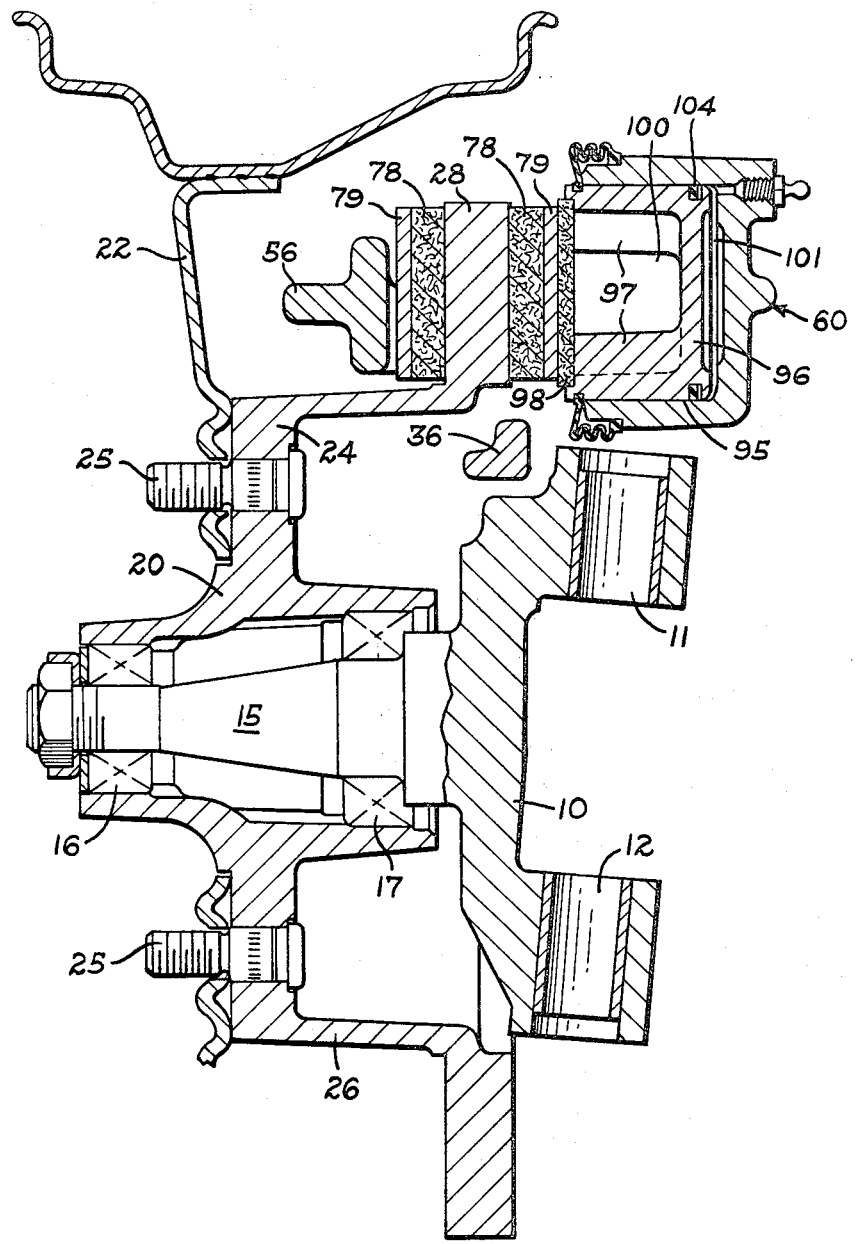

United States Patent Office 3,384,203
Patented May 21, 1968

3,384,203
DISK BRAKES
William D. Walther, Dayton, and Carlos P. Afanador, Centerville, Ohio, assignors to The Dayton Steel Foundry Company, Dayton, Ohio, a corporation of Ohio
Filed Jan. 13, 1966, Ser. No. 520,343
3 Claims. (Cl. 188—73)

ABSTRACT OF THE DISCLOSURE

A floating caliper disk brake in which the caliper is open at the top for removal and insertion of brake plates, and which is formed with arcuately-spaced connecting webs forming a sliding connection with spaced torque arms and forming sliding connections with brake plates in which the torque from the brake plates is transmitted to the torque arms through a short chord-wise connection formed by the webs, and in which a piston unit is removably mounted on the caliper and is connected to the caliper at locations between the plate-supporting connections and the caliper supporting connections.

---

This invention relates to disk brakes and more particularly to a caliper-type disk brake.

The caliper brake of this invention is characterized by its simplicity of construction and ease of manufacture. The caliper is of the "floating" type in that it is mounted for limited movement in a direction parallel to the axis of the disk. It is open at the top for the radial insertion and removal of the pads of friction material and the associated backing plates. A simplified, low-cost and easy-to-service brake construction is provided in which the backing plates and the torque from these plates are carried by pins on the caliper, and in which the caliper is, in turn, mounted for sliding movement on pins carried by torque arms. A piston unit is free of any torque transmitting connection with the backing plates, and is readily removable from the caliper. The caliper is easily removable from the torque arms while maintaining the friction pads and support plates in their relative position on the caliper.

It is accordingly an important object of this invention to provide an improved caliper type brake which is open at the top and in which the braking torque is carried through a "floating" caliper to fixed torque arms.

Another object of this invention is the provision of a disk brake in which a caliper housing is supported at two sliding locations which are preferably bushed with a low-friction material, and through which all of the torque is transmitted from the brake pads to a fixed support.

A still further object of this invention is the provision of a caliper brake which is characterized by simplicity of parts and construction, low manufacturing costs, and ease of maintenance and repair.

These and other objects and advantages will become apparent from the following description, the accompanying drawings and the appended claims.

In the drawings:

FIG. 1 is a vertical section through a disk brake constructed according to this invention;

FIG. 2 is an end elevational view looking at the inboard side of the brake of FIG. 1;

FIG. 3 is a plan view, partially in section, taken generally along the line 3—3 of FIG. 2; and FIG. 4 is an enlarged vertical section taken generally along the line 4—4 of FIG. 3.

Referring to the figures of the drawings which illustrate a preferred embodiment of the invention, a relatively fixed axle or spindle member is shown at 10 in FIG. 1. The spindle member 10 is shown as accommodating king pin bushings 11 and 12, in the usual manner, for pivotal movement about an inclined king pin (not shown). The spindle member 10 includes the usual spindle shaft 15 upon which are mounted wheel bearings 16 and 17.

An integral hub and disk unit 20 is rotatably mounted on the spindle shaft 15 on bearings 16 and 17, and supports a pressed steel wheel 22. For this purpose, the hub-disk unit 20 may be provided with an integral, generally radially-extending wheel flange 24 through which wheel studs 25 are pressed. The hub-disk unit 20 further includes an axially, inwardly-extending, annular flange portion 26 which terminates in a generally radially-extending, annular braking portion 28.

A primary advantage of the integral hub and disk construction shown in FIG. 1 resides in the lower cost of manufacture as compared with that of making a separate hub and disk. Further, concentricity of the disk relative to the hub is more readily obtained where the disk is an integral part of the hub, as distinguished from the usual construction in which the disk is separately attached to the hub. In disk brake installations where the disk portion 28 is required to absorb large quantities of energy, it may be constructed with an integral filling of material having good thermal conductivity, as shown and claimed in the U.S. patent of Dotto and Walther, No. 3,013,636.

The spindle member 10 may be provided with integral, outwardly-extending opposite ears 30 and 31, as shown in FIG. 2, for fixably receiving a torque member 35. The torque member 35 is formed with a connecting portion or web 36 extending transversely between the ears 30 and 31, and has a pair of radially outwardly diverging arms 38 and 39. As shown in FIG. 2, the arms 38 and 39 are integral with the central web portion 36 and are provided with inner mounting pads 40 which align with the ears 30 and 31. The torque member 35 may be suitably secured, such as by bolts 43, to the ears 30 and 31.

As is perhaps best shown in FIGS. 3 and 4, the arms 38 and 39 extend symmetrically outwardly and terminate in outer ends 45 at locations beyond, or outwardly of, the periphery of the disk 20. The outer extremities of the arms are further turned axially forwardly, and may be considered as being axially offset, as indicated at 46 in FIG. 3, so that the ends 45 overlie the periphery of the disk. The ends 45 are further formed with terminal portions 48 which extends arcuately inwardly toward each other and toward the center of the brake. These terminal end portions 48 are bored with axially aligned openings and receive a sleeve-like bushing 50 of low-friction bearing material, such as Teflon (polytetrafluoroethylene), Delrin (polyoxymethane polymer), or the like. Such materials are characterized by their resistance to corrosion, high strength, and their low-friction surfaces. Elastomeric vinyl or rubber lip seals 51 and 52 may be carried on the opposite ends of the bushing 50 to form a dirt and dust tight seal of the associated pin.

The invention further includes a caliper housing 55 which is open at the top and which has a reaction portion 56 positioned chord-wise of the disk 20 at the outboard side of the brake. The portion 56 is formed with raised pressure surfaces 57. The housing 55 further includes a pair of arcuately spaced knuckles or connecting portions 58, one of which is shown in elevation in FIG. 3, and which extend generally axially across peripherally spaced locations with respect to the disk.

The pressure portion of the caliper housing is, in effect, a sub-assembly consisting of the piston unit 60, which is mounted on the connecting portions 58 by machine screws 62. The piston unit 60 is provided with a pair of chord-wires extending arms 64 and 65 which engage machined bosses formed on the faces of the connecting portions 58. The arms 64 and 65 are positioned directly opposite the reaction portion 56 of the housing 55, so that the braking forces applied to the disk are centrally positioned with respect to a common chord. Also, the machine screws 62 and arms 64 and 65 are in line with the center of force. This construction, accordingly, is one in which there is a minimum tendency of uneven or non-uniform pad wear due to deflection of the caliper housing.

The connection portions 58 are arcuately spaced apart and define a radial opening therebetween. They are mounted for limited axial movement on the arm ends 48 by pins 70 and 71 which extend through the bushings 50. For this purpose, each of the portions 58 is provided with a pair of axially spaced ears 74 and 75 which support the pins 70 and 71 therebetween in alignment with the openings in the bushings 50 for sliding movement therein.

The radially unrestricted opening defined between the connecting knuckles 58 provides access for the insertion and removal of a pair of friction pads 78 and their associated backing plates 79. The pads 78 and plates 79 may be of identical construction and are formed with a pair of radially outwardly-extending support tabs 80 which extend, in use, beyond the periphery of the disk. The tabs 80 of the plates 79 are threaded on a further pair of pins 84 and 85 mounted on the caliper housing, which pins exclusively support the pads and receive the torque therefrom. For this purpose, each of the connecting portions of knuckles 58 is provided with a further pair of arcuately inwardly-extending, spaced-apart tabs or ears 88 and 89 in which pin-receiving openings are drilled and which support the pins 84 and 85 therebetween outwardly of the periphery of the disk. The backing plates 79 may be extracted radially by axially withdrawing the pins 84 and 85.

As shown in FIGS. 3 and 4, the knuckles 58 extend in a generally axial direction outwardly of the disk periphery and their center web portions 58' are spaced sufficiently apart arcuately of the disk so as to define an opening therebetween which is slightly greater in width than the width of the backing plates 79. Therefore, the plates 79 are removable by extracting radially without threading or twisting. The bolts 62 connect the arms 64 and 65 at their extremities with the knuckles 58 substantially in line with the arcuate centers of the knuckles, and therefore substantially in line with the web portions 58', as shown in FIG. 4. This connection is generally axially opposite with that of the corresponding chord-wise ends of the reaction portion 56 and results in short axial coupling of the hydraulic braking forces from the pressure portion 60 to the reaction portion 56.

The piston unit 60 is formed with a forwardly-opening cylinder bore 95 in which there is slidably received a cup-shaped piston 96. The piston 96 is internally strengthened by generally axially-extending, radially spaced ribs 97 and is inserted into the bore with its opening facing the adjacent backing plate 79. A circular disk-shaped pad 98 of heat insulating material, such as an asbestos laminate, is received in the mouth or opening of the piston 96 and effectively forms a dead air space 100 within the interior of the piston. The air space 100 and the pad 98 of insulation effectively isolate the hydraulic fluid in the space 101 behind the piston from the heat generated at the disk and the adjacent pad of friction material. Further, a lathe-cut piston seal 104 is carried on an annular groove in the piston adjacent its most inward end, so that the seal is removed as far as possible from the source of heat.

The disk brake construction which has been described is one in which the caliper housing is free to float or align itself axially of the disk on the arms 38 and 39, during the application and release of the brake. The pins 84 and 85 form the exclusive torque-receiving connections in relation to the backing plates 79, and transmit all the braking torque from the pads to the caliper housing. This torque is, in turn, transmitted chordwise through the short coupling of the caliper housing knuckles 58 to the pins 70 and 71 carried on the knuckles, and from these pins to the relatively fixed arms 38 and 39 through the low friction bushings 50. By employing a bushing of low-friction, non-corrosive, long-wearing material, it is practical to transmit the torque through the same connection which provides for the floating movement of the housing, while maintaining the friction therebetween to a minimum. Accordingly, separate torque transmitting connections are eliminated, and the brake structure is simplified.

When it is desired to replace the pads, the wheel 22 may be removed, the snap rings 106 removed, and the pins 84 and 85 extracted. The pads and associated plates may then be moved radially through the opening at the top of the caliper housing, and replaced. The open top further serves to prevent an accumulation of mud and dirt in the caliper housing, and the brake of this invention tends to be self-cleaning since the dirt will be thrown by centrifugal force through the opening between the knuckles 58. The lip seals 51 and 52 maintain a clean bearing surface within the bushings 50.

When it is desired to service the brake without replacing the linings, it is only necessary to remove the wheel 22 to extract the caliper mounting pins 70 and 71. The caliper housing 55 with the attached backing plates 79 and the attached hydraulic unit 60 may then be removed as a unit without disturbing the relative position of the brake lining. Therefore, the lining pads 78 will remain in their initial relative positions and will assume their original places when the caliper is reassembled following service, without the necessity of breaking in the piston pads to a new position.

The entire brake assembly may be removed from the torque arms 38 and 39 without disturbing the hydraulic connections to the brake. If the extent of movement in removal exceeds that which would be provided normally by a flexible hydraulic line 108, the hydraulic piston unit 60 may be readily removed by extracting the screws 62, without disturbing the hydraulic piston. Therefore, the brake construction is one which is easily serviced and eliminates the need for bleeding if it should be necessary to remove or service the caliper housing or the friction pads.

The brake of this invention is characterized by its high utilization of the material, since the support arms 38 and 39 are required to take the torque load only, while the caliper housing takes both the torque load and the braking forces due to the hydraulic fluid pressure. The construction is such that the torque load is transmitted through the short chord-wise coupling at the connecting portions 58, while the same portions 58 transmit the braking forces from the hydraulic unit 60 to the reaction portion 56.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. An improved caliper-type disk brake comprising a rotatable disk, a caliper housing having a chord-wise reaction portion and rigidly connected circumferentially spaced knuckles extending axially adjacent the periphery of said disk and defining an opening therebetween, a pair of brake pads each having a backing plate and positioned within said opening on opposite sides of said disk, means releasably supporting said backing plates on said knuckles at locations adjacent the periphery of said disk and providing for movement of said plates into and out of frictional engagement with said disk while transmitting the brake torque to said knuckles, means defining a pair of rigid torque arms having circumferentially spaced support portions extending generally in overlying relation to the periphery of said disk and arcuately outwardly of said knuckles, spaced caliper housing support means connecting said arm support portions to said knuckles and providing generally axial floating movement of said housing relative to said torque arms and disk, said caliper housing further including a pressure unit having a fluid actuated piston and having means defining a pair of support arms positioned axially opposite said caliper housing reaction portion, and means removably connecting said arms respectively to one of said knuckles adjacent the periphery of said disk at locations arcuately between the corresponding said connecting means for said backing plates and said caliper housing support means to eliminate clam shell deflection of said housing upon the application of braking force by said pressure unit.

2. The disk brake of claim 1 in which said caliper housing knuckles are each formed with a pair of arcuately outwardly extending axially spaced ears, and said spaced caliper housing support means comprises a pair of pins extending respectively between each said pair of ears and slidably received in said torque arm support portions therebetween.

3. The disk brake of claim 2 in which said means releasably supporting said backing plates comprises a further pair of ears on each of said knuckles extending arcuately inwardly therefrom, and a further pair of pins mounted respectively between said further ears, and each of said backing plates being formed with spaced portions slidably engaging said further pair of pins between the associated said further pair of ears.

References Cited
UNITED STATES PATENTS

| | | | |
|---|---|---|---|
| 2,575,578 | 11/1951 | Bricker | 188—73 |
| 2,756,844 | 7/1956 | Chamberlain et al. | 188—152 |
| 2,784,811 | 3/1957 | Butler | 188—73 |
| 2,973,837 | 3/1961 | Wilson | 188—73 |
| 3,236,335 | 2/1966 | Dowell | 188—73 |
| 3,255,848 | 6/1966 | Harrison | 188—73 |

FOREIGN PATENTS 1,090,611 10/1954 France.

MILTON BUCHLER, *Primary Examiner.*

G. E. HALVOSA, *Assistant Examiner.*